(12) United States Patent
Bugmann (10) Patent No.: US 6,327,177 B1
(45) Date of Patent: Dec. 4, 2001

(54) METHOD FOR CONTROLLING A STEPPING MOTOR AND DEVICE FOR IMPLEMENTING SUCH METHOD

(75) Inventor: Rudolf Bugmann, Erlach (CH)

(73) Assignee: Eta S.A. Fabriques d'Ebauches, Grenchen (CH)

( * ) Notice: Subject to any disclaimer, the term of this patent is extended or adjusted under 35 U.S.C. 154(b) by 0 days.

(21) Appl. No.: 09/556,297

(22) Filed: Apr. 24, 2000

(30) Foreign Application Priority Data

Apr. 23, 1999 (CH) .................................................. 0750/99

(51) Int. Cl.[7] ..................................................... H02P 5/17
(52) U.S. Cl. ...................... 365/157; 360/160; 360/217; 318/696
(58) Field of Search ................... 368/155–157, 368/160, 217; 318/696

(56) References Cited

U.S. PATENT DOCUMENTS

| 4,361,410 | 11/1982 | Nakajima et al. .................... 368/157 |
| 4,467,265 | * 8/1984 | Antognini et al. ................... 368/157 |
| 6,034,502 | * 3/2001 | Buhler ................................. 368/217 |

FOREIGN PATENT DOCUMENTS

| 0 154 889 | 9/1985 | (EP) . |
| 0 676 859 | 10/1995 | (EP) . |
| 2 059 649 | 4/1981 | (GB) . |

\* cited by examiner

*Primary Examiner*—Bernard Roskoski
(74) *Attorney, Agent, or Firm*—Griffin & Szipl, P.C.

(57) ABSTRACT

The method consists in subdividing each driving pulse into a certain number of elementary periods of the same duration, in calculating directly or indirectly, at each elementary period, the value of an effective chopping rate He such that He=n1/n2 where n1 is the number of elementary periods during which the coil of the motor was connected to an electric power source from the beginning of the driving pulse and n2 is the total number of these elementary periods from the beginning of the driving pulse, in comparing this effective chopping rate He to the desired chopping rate Hc and, according to whether He≦Hc or He>Hc, in connecting or not connecting the motor coil to the power source from the beginning of the following elementary period.

The device includes the means necessary for implementing this method.

This method and this device allow the number of distinct rates available for chopping the driving pulses to be increased in a much simpler way than with known methods and devices.

9 Claims, 2 Drawing Sheets

METHOD FOR CONTROLLING A STEPPING MOTOR AND DEVICE FOR IMPLEMENTING SUCH METHOD

The present invention concerns a method for controlling a stepping motor including a rotor provided with a permanent magnet and a coil magnetically coupled to said magnet, said method including the application of a driving pulse to said coil each time that said rotor has to rotate by one step, said driving pulse including connection periods during which said coil is connected to an electric power source and disconnection periods during which said coil is disconnected from said source, the ratio between the total duration of said connection periods and the total duration of said disconnection periods being equal to a desired chopping rate.

The present invention also concerns a device for implementing this method.

A device and method of this type are described, for example, in U.S. Pat. No. 4,361,410 where they are illustrated in FIGS. 8 to 11. In this document, after each driving pulse a circuit generates a detection signal having a first or a second state according to whether the mechanical load driven by the rotor of the motor during such driving pulse was relatively low and the rotor has thus rotated properly, or whether said mechanical load was so high that the rotor has not rotated. A combinatorial logic circuit generates control pulses having a chopping rate of 50% or 75% according to whether the detection signal has its first or second state, and the control pulses are used to chop, with the same rate, the following driving pulse. The quantity of electric power supplied to the coil of the stepping motor is thus enslaved to the mechanical load driven by the rotor of said motor, which reduces the quantity of electric energy.

It will be recalled that a chopped driving pulse includes a certain number of periods during which the motor coil is connected to an electric power source, these connection periods being separated from each other by disconnection periods, i.e. during which the motor coil is disconnected from the power source.

It will also be recalled that the chopping rate of such a driving pulse is generally defined as being the ratio between the total duration of the connection periods which have just been mentioned and the total duration of the driving pulse. It is this definition which will be used in the following description.

It will also be noted that, in aforementioned U.S. Pat. No. 4,361,410, the definition of the chopping rate of the driving pulses is the reverse of this generally accepted definition. It follows that the rate of 0% and 25% mentioned in such document are in fact, according to the generally accepted definition, rates of 100% and 75% respectively.

Those skilled in the art will easily see that the slaving achieved by the circuit of FIG. 8 of U.S. Pat. No. 4,361,410 succinctly described hereinbefore is very scanty, and that the reduction in the electric energy consumed by the motor resulting from this control is thus very low, due to the fact that only two driving pulse chopping rates are provided.

It is of course possible to increase the number of chopping rates available, in order to improve the slaving of the quantity of electric energy provided to the motor coil to the mechanical load driven by the rotor thereof, and to further reduce the total quantity of the electric energy consumed by the motor.

However the complexity of the combinatorial logic which generates the control pulses used to chop the driving pulses increases rapidly with this number of available chopping rates. The same is of course true of the place occupied by the logic in the integrated circuit in which it is made, and consequently the cost price of the latter. It has been observed that, in practice, it is not possible to provide more that eight or ten distinct chopping rates if one wishes the cost price to remain within bearable limits. It is often desirable to have a higher number of chopping rates available in order to be able to reduce the power consumption of the stepping motor by slaving as closely as possible the quantity of electric energy provided thereto during each driving pulse to the mechanical load effectively driven by its rotor. This is particularly the case when the motor is that which drives the hands of a timepiece whose source of electric power is formed by a battery or an accumulator of small volume and thus of quite limited capacity.

It is also desirable to have available a quite high number of chopping rates when the supply voltage of the motor can vary quite significantly, as is the case when the motor is that which drives the hands of an electronic timepiece but where the power source of the latter is formed by a rechargeable system, for example by solar cells or a barrel-generator.

One object of the present invention is thus to provide a method for controlling a stepping motor as a result of which the number of rates available for chopping the driving pulses applied to the motor coil can be much higher than when the known method described hereinbefore is used, without the complexity and thus the cost price of the circuit which allows the method to be implemented, being increased too much, the slaving of the quantity of electric energy supplied to the motor coil to the mechanical load driven by the rotor thereof being thus able to be considerably improved and the total electric power consumption of the motor being thus able to be considerably reduced.

This object is achieved by the method whose features are listed in claim 1 annexed hereto.

Another object of the present invention is to propose a control circuit for a stepping method which implements this method.

This object is achieved by the circuit whose features are listed in claim 6 annexed hereto.

As will be explained in detail hereinafter, these features of the method according to the present invention and the device which implements the method allow the number of distinct values which the chopping rate of the driving pulses applied to the motor coil can take to be considerably increased. It follows that the quantity of electric energy which has to be supplied to the coil can be slaved much better to the mechanical load driven by the rotor of the motor, which results, all other things being equal, in a reduction in such quantity of electric energy.

Figure 1:
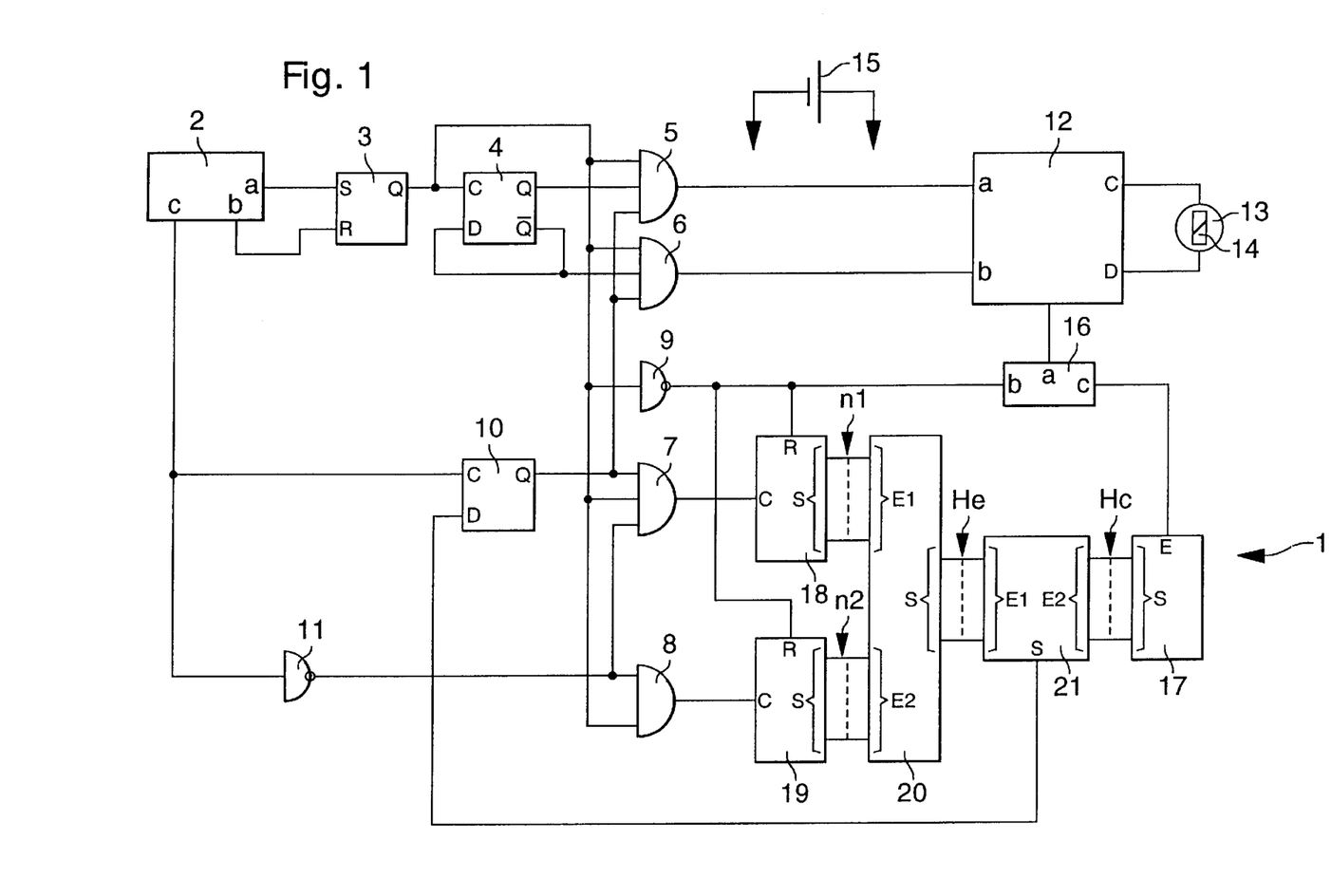
FIG. 1 is a diagram of a first embodiment of the device according to the present invention.

Other objects and advantages of the present invention will be made clear by the following description which will be made with reference to the annexed drawing, in which:

FIG. 1 shows schematically and by way of non limiting example a device according to the present invention in a case where the latter is used to control the stepping motor of an electronic timepiece. This timepiece, several other components of which have also been shown in FIG. 1, is designated as a whole by the reference 1.

In order to simplify the following description, the <<0>> and <<1>> logic states which can be taken by the various signals existing in device 1 will simply be called <<0>> state and <<1>> state respectively.

Timepiece 1 includes in a conventional manner a time base circuit 2 formed of a quartz oscillator and a frequency divider which have not been shown separately and which will not be described in more detail, since they are well known to those skilled in the art.

It will simply be mentioned that, in this example, time base circuit 2 includes three outputs designated by the references 2a, 2b and 2c generating periodic signals in the form of square pulses having respectively a frequency of 1 Hz, 128 Hz and 16.384 Hz. The periods of these three signals is thus respectively 1 second, approximately 7.8 milliseconds, and approximately 61 microseconds.

Outputs 2a and 2b of time base 2 are respectively connected to the S and R inputs of a flip-flop or bistable trigger circuit, which is of the well known RS type and which is designated by the reference 3.

The direct output Q of flip-flop 3 is connected to the clock input C of a D type flip-flop designated by the reference 4, as well as to a first input of four AND gates respectively 5, 6, 7 and 8, and to the input of an inverter 9.

Direct output Q of flip-flop 4 is connected to a second input of gate 5, whereas its reverse output Q is connected to its data input D and to a second input of gate 6.

Output 2c of time base 2 is connected to clock input C of another D flip-flop, designated by the reference 10, as well as to the input of an inverter 11, whose output is connected to a second input of gates 7 and 8.

Those skilled in the art will note that inverter 11 can be made preferably by a plurality of inverter gates connected in series to form an inverter circuit with a long reaction time, so that the lag of signal Q of flip-flop 10 with respect to signal C is less than that of the signal leaving inverter 11 with respect to signal C.

Direct output Q of flip-flop 10 is connected to a third input of gates 5, 6 and 7.

The outputs of gates 5 and 6 are respectively connected to a first input 12a and to a second input 12b of a driving pulse shaping circuit 12 having two outputs 12c and 12d.

The stepping motor driving the hands of timepiece 1 is shown only schematically in FIG. 1 where it is designated by the reference 13. Motor 13 includes, in a conventional manner, a rotor provided with a permanent magnet, a coil and a stator magnetically coupling said coil and said magnet. Only the coil of motor 13 has been shown in FIG. 1 where it is designated by the reference 14. The two terminals of this coil 14 are respectively connected to output 12c and output 12d of shaping circuit 12.

Shaping circuit 12 will not be described in detail here since it is a circuit well known to those skilled in the art. It will simply be mentioned that it is arranged so that, when its inputs 12a and 12b are both at the <<0>> state, coil 14, or at least one of its terminals, is disconnected from the electric power source which supplies the various circuits of device 1 and which is shown schematically with the reference 15. In this case, coil 14 is also short-circuited in a conventional manner.

Shaping circuit 12 is also arranged so that, when its inputs 12a and 12b are respectively at the <<1>> state and the <<0>> state, coil 14 is connected to source 15, this connection being such that a current flows through coil 14 for example from terminal 12c to terminal 12d of shaping circuit 12. Likewise, when inputs 12a and 12b of shaping circuit 12 are respectively at the <<0>> state and the <<1>> state, coil 14 is also connected to source 15. A current thus also flows in coil 14, but in the same example, from terminal 12d to terminal 12c of shaping circuit 12.

Shaping circuit 12 further includes an output 12e which is connected to an input 16a of a detection circuit 16 and which supplies the latter with a signal representative, for example, of the intensity of the current flowing in coil 14.

Detection circuit 16 will not be described in detail either, since it can be made in various ways which are well known to those skilled in the art. It will simply be mentioned here that it further includes a control input 16b connected to the output of inverter 9 and an output 16c, and that it is arranged so as to supply output 16c, in response to a signal which it receives from output 12e of shaping circuit 12, a signal which takes, after each driving pulse applied to coil 14 by shaping circuit 12, a first or a second state according to whether the rotor of motor 13 has rotated properly or has not rotated in response to this driving pulse.

Output 16c of detector 16 is connected to an input E of a determination circuit 17 having outputs S whose <<0>> and <<1>> states form a binary number. It will be seen hereinafter that this binary number is equal to the value which the chopping rate of the driving pulses applied to coil 14 by shaping circuit 12 has to have. This number will thus be called the desired chopping rate and will be designated by Hc.

It will be noted that desired chopping rate Hc is a number which is always positive and less than or equal to 1.

Determination circuit 17 will not be described in detail, since it can be made in various manners without any difficulty by those skilled in the art. It will simply be mentioned that determination circuit 17 is arranged, in the present example, so that the number Hc decreases by a determined quantity to a predetermined minimum value, each time that the detection signal supplied by output 16c of circuit 16 takes its first state at the end of a driving pulse because this driving pulse has caused the rotor of motor 13 to rotate properly. Further, the number Hc increases to its maximum value each time that the detection signal takes its second state at the end of a driving pulse because the latter has not caused the rotor of motor 13 to rotate properly.

The output of gate 7 is connected to the counting input C of a counter 18 formed, in the present example, of seven flip-flops cascade-connected in a conventional manner which have not been shown separately. The binary number formed by the <<0>> or <<1>> states of the direct outputs of these seven flip-flops, which form the S outputs of counter 18, can thus take values which go from zero to 127, when expressed in decimal notation. This binary number will thus be called number n1 in the description which follows.

Counter 18 includes an input R connected to the output of inverter 9, and it is arranged so that aforementioned number n1 is kept at zero as long as this input R is at the <<1>> state.

The output of gate 8 is connected to the counting input C of a counter 19 which is identical to counter 18 and which will thus not be described in more detail here. It will simply be mentioned that the binary number present at the outputs S of counter 19 will be called number n2 in the description which follows, and that this number n2 is also kept at zero as long as input R of counter 19, which is also connected to the output of inverter 9, is at the <<1>> state.

As will be described in detail hereinafter, numbers n1 and n2 which have just been mentioned, vary during each driving pulse applied to coil 14 of motor 13, number n2 always being greater than or equal to number n1. For a reason which will be made clear hereinafter, the ratio n1/n2, which also varies during each driving pulse, will be called the effective chopping rate and designated by the reference He.

It will also be seen that, in the present example, this ratio n1/n2, and thus effective chopping rate He, can take a very large number of distinct values, all positive and less than or equal to 1.

Outputs S of counters 18 and 19 are respectively connected to inputs E1 and to inputs E2 of a computing circuit 20. This computing circuit 20 will not be described in detail here either, since it may be made in various ways without any difficulty by those skilled in the art. It will simply be mentioned that computing circuit 20 is arranged so as to divide number n1 by number n2 and to provide at its outputs S, in binary form, the result of this division, i.e. number He. It will also be mentioned that computing circuit 20 is arranged so that number He is equal to zero when numbers n1 and n2 are themselves equal to zero.

For a reason which will be made clear hereinafter, outputs S of computing circuit 20 and outputs S of determination circuit 17 are respectively connected to inputs E1 and inputs E2 of a comparator circuit 21 having an input S connected to data input D of flip-flop 10.

Comparator 21 will not be described in detail either. It will simply be mentioned that it is arranged so that its output S is at the <<0>> state when number He at its inputs E1 is greater than number Hc at its inputs E2, and that this output S is at the <<1>> state when this number He is less than or equal to number Hc.

Before starting to describe the operation of the device shown in FIG. 1, it should be emphasised that, in the present example, flip-flops 3, 4 and 10 as well as counters 18 and 19 react to the passage from the <<1>> state to the <<0>> state of their S and R inputs respectively C input. In other words, output Q of flip-flop 3 takes the <<1>> state or the <<0>> state according to whether its S input or its R input passes from the <<1>> state to the <<0>> state. Likewise, output Q of flip-flops 4 and 10 takes the state of their input D when their C input passes from the <<1>> state to the <<0>> state, and the content of counters 18 and 19, i.e. numbers n1 and, respectively n2, increase by one unit each time that counting input C of these counters passes from the <<1>> state to the <<0>> state, provided of course that their R input is at the <<0>> state.

In order to simplify the following description, the periodic signals provided by outputs 2a, 2b and 2c of time base 2 will be called respectively signal 2a, signal 2b and signal 2c.

Moreover, it will be assumed that, at the beginning of this description and in order to make it within a concrete case, number Hc at outputs S of determination circuit 17 is equal to 0.7 or 70%, this value having been chosen arbitrarily. The circumstances in which this number Hc varies will be described hereinafter.

The operation of the device of FIG. 1 will now be described arbitrarily starting at an instant when signals 2a, 2b and 2c pass simultaneously from the a <<1>> state to the <<0>> state. This instant will be called instant T0.

It is well known that signal 2c alternately and periodically takes the <<0>> and <<1>> states. In the following description, the instants when signal 2c takes the <<0>> state will be called instants T. Moreover, these instants T will be numbered from instant T0, which will thus be followed by instants T1, T2, T3, . . . etc. Likewise, the instants when signal 2c takes the <<1>> state will be called instants J, and these instants J will be numbered from instant T0. Instant T0 will thus be followed by instants J1, J2, J3, . . . etc., each of the latter being situated between two instants T.

In order to avoid repeating this several times in the following description, it should be noted here that each instant T is separated from the preceding and following one by a lag equal to a period of signal 2c, i.e. approximately 61 μs in the present example. Likewise, it should be noted that each instant J is separated from the preceding and following instant T by a lag equal to a half period of signal 2c, i.e. approximately 30.5 μs.

It will also be assumed that, at instant T0, output Q of flip-flop 4 is at the <<1>> state. It will be seen hereinafter in what circumstances this output Q of flip-flop 4 passes to the a <<0>> state.

As will be made clear hereinafter, output Q of flip-flop 3 is at the <<0>> state just before instant T0. It follows that inputs 12a and 12b of shaping circuit 12 are then also at the <<0>> state so that coil 14 is disconnected from power source 15. It also follows that numbers n1 and n2 are both zero since the output of inverter 9 and thus the R inputs of counters 18 and 19, are at the <<1>> state.

Number He at the S outputs of computing circuit 20 is thus also zero and thus less than number Hc, which, it will be recalled is equal to 0.7 in the present example. The S output of comparator 21 and, thus, input D of flip-flop 10 are also at the <<1>> state.

At instant T0, output Q of flip-flop 3 passes to the <<1>> state, which has no effect on flip-flop 4 whose output Q remains at the <<1>> state. However, the output of inverter 9 and the R inputs of counters 18 and 19 pass to the <<0>> state, so that the latter can begin to operate.

At instant T0, signal 2c also passes to <<0>>, so that output Q of flip-flop 10, whose input D is then at the <<1>> state, takes state <<1>>.

As the three inputs of gate 5, and thus input 12a of shaping circuit 12, are kept at the <<1>> state whereas input 12b thereof remains at the <<0>> state, a current begins to flow from output 12c of shaping circuit 12 to its output 12d through coil 14 of motor 13. In other words, this coil 14 is connected, via shaping circuit 12, to power source 15. In other words, shaping circuit 12 begins to apply a driving pulse to coil 14 at instant T0.

Moreover, as the inputs of gates 7 and 8 are all at the <<1>> state, the same is true of counting inputs C of counters 18 and 19. Numbers n1 and n2 thus do not change and both remain at zero.

At instant J1, i.e. approximately 30 μs after instant T0, signal 2c again passes to the <<1>> state, so that the output of inverter 11 passes to the <<0>> state, as do the outputs of gates 7 and 8 and, thus, counting inputs C of counters 18 and 19. Numbers n1 and n2 thus both take the value 1.

Number He, which, it will be recalled, is equal to the ratio n1/n2, thus also takes the value 1 and thus becomes greater than number Hc. The S output of comparator 21 thus takes the <<0>> state, as does input D of flip-flop 10.

When signal 2c passes to the <<0>> state again at instant T1, i.e. approximately 61 μs after instant T0, output Q of flip-flop 10 again passes to the <<0>> state since input D of flip-flop 10 is then itself at the <<0>> state.

Input C of counter 18 is thus kept at the <<0>> state, although the output of inverter 11 passes to the <<1>> state at instant T1, whereas input C of counter 19 again passes to the <<1>> state.

The passage of output Q of flip-flop 10 to the <<0>> state causes input 12a of shaping circuit 12 also to pass to the <<0>> state. Shaping circuit 12 thus disconnects coil 14 from power source 15 and short-circuits the latter. The current which was flowing in coil 14 is thus not interrupted abruptly, but decreases, as those skilled in the art know, in a way which depends on the electric and magnetic properties of motor 13.

At instant J2, i.e. approximately 30.5 μs after instant T1, signal 2c again passes to the <<1>> D state and the output of inverter 11 again passes to the <<0>> state.

It can be seen that only input C of counter 19 then passes from the <<1>> state to the <<0>> state, since input C of counter 19 has been kept at the <<0>> state as seen hereinabove.

It follows that, at instant J2, the content of counter 19, i.e. the figure n2, takes the value 2 whereas the content of counter 18, i.e. the figure n1, remains equal to 1.

From instant J2, the value of number He, which is equal to n1/n2, thus becomes equal to 0.5, i.e. less than number Hc.

The S output of comparator 21 and input D of flip-flop 10 thus again take the <<1>> state, so that when signal 2c again passes to the <<0>> state at instant T2, output Q of flip-flop 10 again passes to the <<1>> state. It follows that shaping circuit 12 again connects coil 14 to power source 15, and the current passing through coil 14 begins to increase again.

It also follows that input C of counter 18 also passes to the <<1>> state again, so that when the output of inverter 11 again passes to the <<0>> state at instant J3, i.e. approximately 30.5 µs after instant T2, the content of the two counters 18 and 19 increases by one unit. Number n1 thus takes the value 2 and number n2 the value 3. As a result, number He takes the value 0.66 which is still less than the value of number Hc, which is 0.7. The S output of comparator 21 thus remains at the <<1>> state. Output Q of flip-flop 10 thus remains at the <<1>> state when signal 2c again passes to the <<0>> state at instant T3.

Input 12a of shaping circuit 12 thus remains at the <<1>> state after instant T3, so that coil 14 remains connected to power source 15.

At instant J4 when signal 2c again passes to the <<1>> state, the content of the two counters 18 and 19 again increases by one unit, so that numbers n1 and n2 respectively take the values 3 and 4.

Number He thus takes the value 0.75 and thus becomes greater than number Tc. The S output of comparator 21 thus passes to the <<0>> state. At instant T4, output Q of flip-flop 10 thus again passes to the <<0>> state, and shaping circuit 12 again disconnects coil 14 from power source 15.

The process described above continues to occur until signal 2b passes to the <<0>> state again approximately 7.8 ms after instant T0, i.e. at instant T128 as can easily be seen. At this instant T128, output Q of flip-flop 3 again passes to the <<0>> state. It can easily be seen that this output 0 of flip-flop 3 remains in this <<0>> state until signal 2a itself passes to the <<0>> state again, i.e. 1 second after instant T0 in the present example. During all this time, the outputs of gates 5 and 6 as well as inputs 12a and 12b of shaping circuit 12 are kept at the <<0>> state, so that coil 14 is disconnected from power source 15. The driving pulse which had started at instant T0 thus ends at instant T128.

It can easily be seen that, during this driving pulse, the effective chopping rate He oscillates either side of the desired chopping rate value Hc, i.e. 0.7 in this example. Moreover, at the end of this driving pulse, effective chopping rate He practically reaches this desired chopping rate value Hc.

The passage of output Q of flip-flop 3 to the <<0>> state, at instant T128, also causes flip-flop 4, whose reverse output Q takes the <<1>> state, to change state. It follows that, during the following driving pulse, which will begin when signal 2a again passes to the <<0>> state, it will be the output of gate 6 and input 12b of shaping circuit 12 which will alternately change state in a similar way to that described above with reference to the output of gate 5 and input 12a of shaping circuit 12, these latter then remaining at the <<0>> state. The current which will flow in coil 14 when input 12b of shaping circuit 12 is at the <<1>> state will then have the opposite direction to that which it had in the preceding case.

As output C of flip-flop 3 has been at the <<0>> state since aforementioned instant T128, the output of inverter 9 then takes the <<1>> state, so that numbers n1 and 2 become zero again.

The passage of the output of inverter 9 to the <<1>> state also causes circuit 16 to generate the aforementioned detection signal. In response to the first state of this detection signal, i.e. if the driving pulse which has just ended has caused the rotor of motor 13 to rotate properly, determination circuit 17 reduces number Hc at its S outputs and gives it, for example, the value 0.69.

During the next driving pulse, a process similar to that which was described hereinbefore will take place, but effective chopping rate He which will be calculated at each instant J of the next pulse will be compared to this new value 0.69, of desired chopping rate Hc.

At each instant T, during this new driving pulse, shaping circuit 12 will thus connect coil 14 to power source 15 or disconnect coil 14 from power source 15 according to whether, at the same instant T, effective chopping rate He is equal to or less than 0.69, or greater than this value.

Effective chopping rate He thus oscillates either side of 0.69 during this new driving pulse and, at the end of the latter, it will practically reach this value. At the end of this new driving pulse, determination circuit 17 again decreases the value of desired chopping rate Hc if this driving pulse has caused the rotor of motor 13 to rotate properly.

It can be seen that as long as the driving pulses applied to coil 14 cause the rotor of motor 13 to rotate properly, desired chopping rate Hc and thus effective chopping rate He decrease, as of course does the quantity of electric energy consumed by coil 14.

If, at the end of a driving pulse, the detection signal generated by circuit 16 takes its second state because the rotor of motor 13 has not rotated properly in response to this driving pulse, determination circuit 17 gives chopping rate Hc at its S outputs a predetermined value for the correction pulse, this value being able to be, for example, its maximum value, i.e. 1. It follows that, during this correction pulse, effective chopping rate He, which will be calculated as was described hereinabove, will also be equal to 1 in accordance with the preceding example. Coil 14 of motor 13 will thus be permanently connected to power source 15.

The quantity of electric energy provided to coil 14 during this correction pulse will thus be maximum, which, in principle, will allow the rotor of motor 13 to correct the step which it did not take in response to the preceding driving pulse. Those skilled in the art will easily understand that means must be provided so that, during this correction driving pulse, flip-flop 4 again takes the state which it had during the preceding driving pulse, and so that this correction pulse is applied to coil 14 as soon as possible after the end of the preceding pulse. These means have not been shown, since they have no direct relation to the present invention and the making thereof poses no particular problem to those skilled in the art.

In the afore cited case of a missed step (i.e. the case in which the rotor of motor 13 has not rotated properly in response to a driving pulse), desired chopping rate Hc is increased for the following driving pulse.

In the example of the device according to the present invention which has just been described, each driving pulse is subdivided into 128 elementary periods each starting at one of instants T0 to T127, and coil 14 is either connected to power source or disconnected therefrom during each of these elementary periods.

The number of elementary periods during which coil 14 is connected to power source 15 can thus vary, theoretically at least, from 1 to 128. The number of different values which the effective chopping rate for the driving pulses can take is thus, again theoretically, equal to 128, these values going from $1/128$, i.e. approximately 0.008, to 128/128, i.e. 1.

It is obvious that, in practice, the chopping rate of a driving pulse cannot have a value less than a minimum value which depends on various factors such as the features of the motor controlled by the pulse, the size of the mechanical load driven by its rotor or the voltage supplied by the power source which supplies the device with power. The Applicant has observed that, in general, the coil has to have a motor like those which are commonly used in timepieces of small volume, in wristwatches, for example, i.e. which are connected to their power supply for at least 20 of the elementary periods, which corresponds to a chopping rate of approximately 0.16. Nonetheless, despite this limitation, the number of different values which the chopping rate can take, which is greater than 100 in this example, is much larger than in known devices.

It can further be seen that the chopping rate resolution has a value of approximately 0.008, which corresponds to a considerable improvement with respect to known devices.

It follows from the foregoing that the quantity of electric energy consumed by the stepping motor can be slaved to the mechanical load effectively driven by the rotor thereof in a much better way than in known devices.

This quantity of electric energy consumed by the stepping motor can thus be reduced even more than in known devices, which results in an increase in the lifetime of the source which supplies the power or, for the same lifetime, a reduction in the volume which the power source requires.

It should be noted that these advantages of the device according to the present invention are obtained without the latter having to include a complex and cumbersome combinatorial logic circuit, which would be the case if one wished to increase the number of different values of the driving pulse chopping rate in a known device.

It will also easily be observed that, in a device according to the present invention, as has just been described, the elementary periods during which coil 14 is connected to power source 15 are regularly distributed over the duration of the driving pulse whatever the chopping rate thereof, and without it being necessary to take any special measures for such purpose.

Another embodiment of a device according to the present invention is based on the following considerations:

desired chopping rate Hc is equal to N1/N2 in which N2 is the total number of elementary periods which form the driving pulse and N1 is the number of these periods during which the coil of the motor has to be connected to the power source of the device. N2 is obviously also equal to the sum of number N1 and a number N3 which is the number of elementary periods during which the motor coil has to be disconnected from the power source. One can thus be express:

$$Hc = \frac{N1}{N1 + N3} \quad (1)$$

the sum of N1+N3 being of course equal to N2. During any driving pulse, N1, N2 and N3 are constant numbers as is, of course, Hc, at any instant T, which will be noted as T(i) and which is situated at the end of an elementary period P(i):

$$He(i) = \frac{n1(i)}{n2(i)}$$

where n1(i) is the number of elementary periods of the driving pulse during which coil 14 has been connected to source 15 between instant T0, i.e. the beginning of the driving pulse, and instant T(i), and n2(i) is the total number of elementary periods which have elapsed between instants T0 and t(i).

One can also express:

$$He(i) = \frac{n1(i)}{n1(i) + n3(i)} \quad (2)$$

where n3(i) is the number of elementary periods during which coil 14 has been disconnected from source 15 between instants T0 and T(i), the sum n1(i)+n3(i) being of course equal to n2(i), according to the method of the present invention, one has to know whether, at instant T(i), He(i) is less than or equal to Hc, or whether He(i) is greater than Hc. In the first case, coil 14 has to be reconnected to source 15 during the following elementary period beginning at this instant T(i), i.e. period P(i+1). In the second case, coil 14 has to be disconnected from source 15 during period P(i+1).

In other words, it must be known, at instant T(i), whether:

$$He(i) - Hc \leq 0 \quad (3)$$

or $$He(i) - Hc > 0 \quad (4)$$

By using equations (1) and (2) above, it can be seen that:

$$He(i) - Hc = \frac{n1(i)}{n1(i) + n3(i)} - \frac{N1}{N1 + N3}$$

and after simplification:

$$He(i) - Hc = \frac{n1(i) \cdot N3 - n3(i) \cdot N1}{[n1(i) + n3(i)] \cdot [N1 + N3]}$$

It can be seen that the denominator of this latter fraction is always positive. The sign of the difference [He(i)−Hc] is thus always that of the numerator of this latter fraction, which will be designated M(i). Thus:

$$M(i) = n1(i) \cdot N3 - n3(i) \cdot N1 \quad (5)$$

It can also be seen that the determination of the variable M(i) at instant T(i) indirectly constitutes determination of effective chopping rate He(i) at instant T(i). It is also to be noted that if M(i) is less than or equal to zero, the same is true of difference He(i)−Hc, which means that He(i) is less than or equal to Hc. Conversely, if M(i) is greater than zero, the same is true of difference He(i)−Hc, which means that He(i) is greater than Hc.

In order to know whether, at instant T(i), coil 14 has to be connected to source or not, one need only determine whether, if at instant T(i), M(i) is less than or equal to zero or, respectively, greater than zero, which could occur quite easily during elementary period P(i) as will be seen hereinafter.

The foregoing is obviously valid for all instants T, with the exception of instant T0, for which it will preferably be assumed that M(0)=0. At instant T(i−1) which immediately precedes instant T(i), thus:

$$M(i-1) = n1(i-1) \cdot N3 - n3(i-1) \cdot N1 \quad (6)$$

If, at instant T(i−1), M(i−1)≦0, coil 14 was connected to source 15 during elementary period P(i), which started at instant T(i−1). Thus, during this period P(i), only n1 has increased by one unit, whereas n3 has not changed. Thus, at instant T(i):

$$n1(i)=n1(i-1)+1$$

and $$n3(i)=n3(i-1)$$

It follows that in the event that equation (5) becomes:

$$M(i)=[n1(i-1)+1]\cdot N3-n3(i-1)\cdot N1$$

and thus:

$$M(i)=M(i-1)+N3 \quad (7)$$

If conversely, at instant T(i−1), M(i−1)>0, coil 14 was not connected to source 15 during period P(i). During period P(i), n1 has thus not changed, whereas n3 has increased by one unit. Thus, at instant T(i):

$$n1(i)=n1(i-1)$$

and $$n3(i)=n3(i-1)+1$$

It follows that, in this case, equation (5) becomes:

$$M(i)=n1(i-1)\cdot N3-[n3(i-1)]\cdot N1$$

and thus:

$$M(i)=M(i-1)-N1$$

or which amounts to the same, $$M(i)=M(i-1)+(-N1) \quad (8)$$

It can be seen that if the value and the sign of variable M is known at the beginning of any elementary period, the value and sign of variable M can easily be calculated at the end of the same elementary period, which is also the beginning of the next elementary period.

It can also be seen that, in both possible cases, this calculation requires only a simple addition, which is obviously easier to perform than the division which is necessary in the embodiment shown in FIG. 1.

Figure 2:
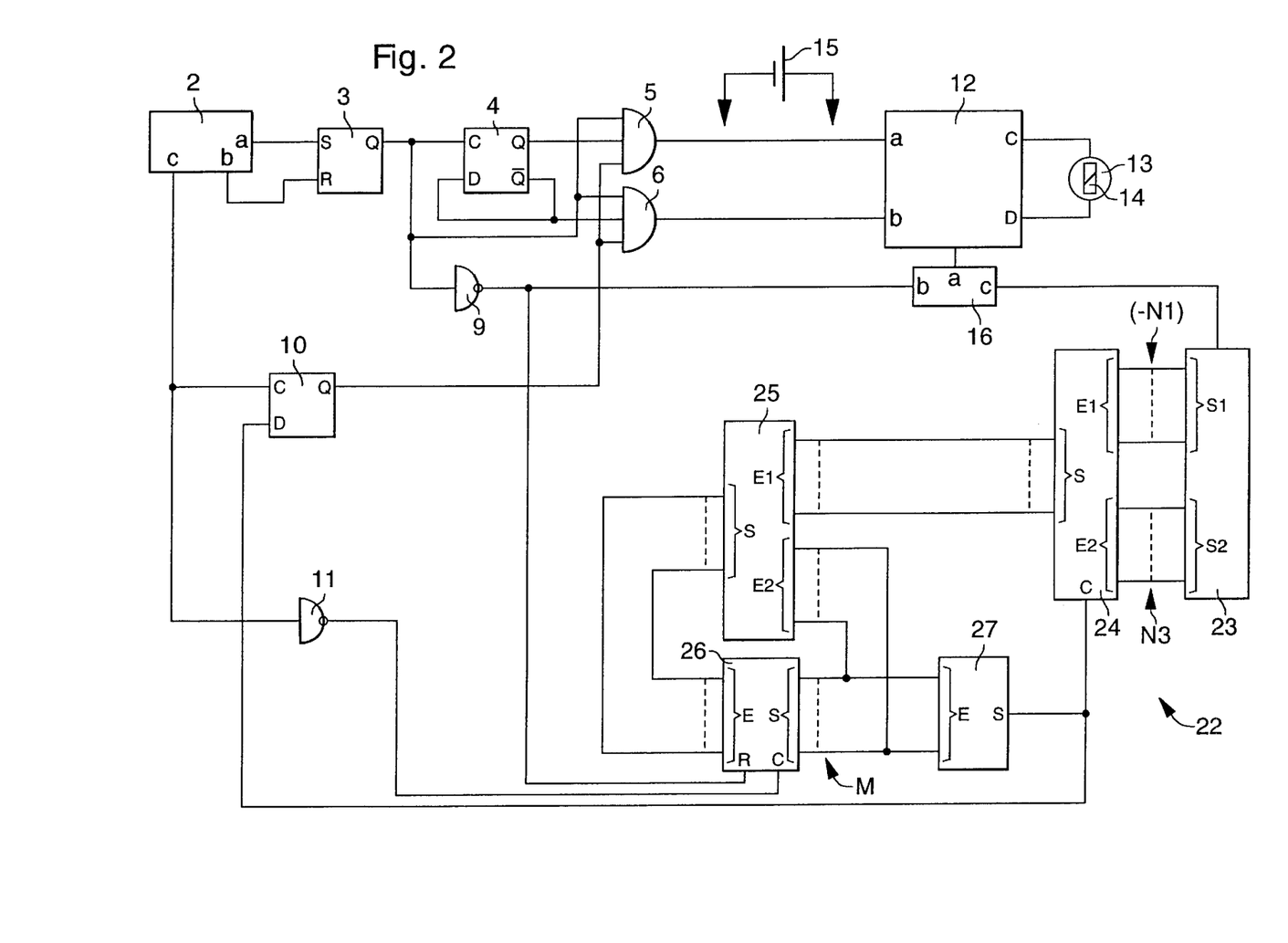
FIG. 2 is a diagram of another embodiment of the device according to the present invention.

FIG. 2 shows schematically and by way of non limiting example a device according to the present invention in which effective chopping rate He is calculated and compared to desired chopping rate Hc indirectly using the considerations which have just been made.

As in the case of FIG. 1, this device is used to control the stepping motor of an electronic timepiece which is designated by the general reference 22.

The various components of this timepiece 22 which are designated by the references 2 to 6 and 9 to 16 are respectively identical to the components of timepiece 1 of FIG. 1 which are designated by the same references and which will not thus be described again here.

In the device of FIG. 2, output 16c of detection circuit 16 is connected to the input E of a determination circuit 23 having two groups of outputs respectively designated S1 and S2.

As will become clear hereinafter, the binary number formed by the <<0>> and <<1>> states of outputs S1 of circuit 23 is equal to the number (−N1 ), i.e. to the number, with the sign changed, of elementary periods of each driving pulse during which coil 14 has to be connected to source 15. Likewise, the binary number formed by the <<0>> and <<1>> states of outputs S2 of circuit 23 is equal to the number N3 of elementary periods of each driving pulse during which coil 14 has to be disconnected from source 15.

It will be recalled that the sum of numbers N1 and N3 is equal to the total number, designated here N2, of the elementary periods which form each driving pulse.

Like circuit 17 of FIG. 1, circuit 23 thus determines, indirectly in this case, desired chopping rate Hc which each driving pulse applied to coil 14 of motor 13 must have.

Determination circuit 23 will not be described in detail, since it can be made without difficulty by those skilled in the art. It will simply be mentioned that it must obviously be arranged so that number N1 decreases to a predetermined minimum value, for example, by one unit each time that the detection signal provided by circuit 16 takes its first state at the end of a driving pulse, this signal thereby indicating that the driving pulse has caused the rotor of motor 13 to rotate properly. In the same case, number N3 must obviously increase by one unit. Determination circuit 23 must further be arranged so that number N1 increases, for example, to its maximum value each time that the detection signal takes its second state at the end of a driving pulse, this signal thereby indicating that the rotor of motor 13 has not rotated properly in response to this driving pulse. In this same case, number N3 must obviously decrease.

Outputs S1 and S2 of determination circuit 23 are respectively connected to inputs E1 and E2 of a selector circuit 24 which will not be described in detail here either, since it is a circuit well known to those skilled in the art. It will simply be mentioned that selector 24 also includes outputs S and a control input C. Further, selector 24 is arranged so that its outputs S are connected to its inputs E1 or E2 according to whether its control input C is at the <<0>> state or <<1>> state. In other words, the <<0>> and <<1>> states of outputs S of selector 24 form the number (−N1) or the number N3 according to whether its control input C is at the <<0>> or <<1>> state.

Outputs S of selector 24 are connected to first inputs E1 of an adder circuit 25 which also has second inputs E2 and outputs S.

Adder 25 will no be described in detail either, since it is a circuit well known to those skilled in the art. It will simply be mentioned that adder circuit 25 is arranged so that the <<0>> or <<1>> states of its outputs S permanently form a binary number equal to the sum of the binary numbers formed by the <<0>> or <<1>> states of its inputs E1 and, respectively of its inputs E2, Outputs S of adder circuit 25 are connected to inputs E of a register 26 which also has outputs S, a control input C connected to the output of inverter 11 and to a reset input R.

Register 26 is also a well known circuit and will not therefore be described in detail here. It will simply be mentioned that it is arranged so that all its outputs S are kept at the <<0>> state while its input R is at the <<1>> state. It will also be mentioned that when this input R is at the <<0>> state, outputs S of register 26 take the same state as its inputs E in response to the passage of its control input C from the <<1>> state to the <<0>> state. In other words, the binary number formed by the <<0>> and <<1>> states of outputs S of register 26 becomes equal to the binary number formed by the <<0>> and <<1>> states of its inputs E when its control input C passes from the <<1>> state to the <<0>> state. As will be made clear hereinafter, the binary number formed by the <<0>> or <<1>> states of outputs S of register 26 is the number M defined above.

Outputs S of register 26 are connected on the one hand to inputs E2 of adder circuit 25 and, on the other hand, to inputs E of a comparator 27 having an output S connected to control input C of selector 24 and to data input D of flip-flop 10. Comparator 27 will not be described in detail either, since it is also a well known circuit. It will simply be mentioned that comparator 27 is arranged so that its output S is at the <<0>> logic state when the binary number formed by the <<0>> and <<1>> states of its inputs E, i.e. number M, is greater than zero, and so that output S is at the <<1>> state when binary number M is less than or equal to zero.

As in the description of the working of the device of FIG. 1, the instants when signal 2c passes from the <<1>> state to the <<0>> state will be called T. In particular, instant T when the two signals 2a and 2b also pass to the <<0>> state, i.e. the instant of the beginning of a driving pulse, will be called instant T0.

Likewise, the instants when signal 2c passes from the <<0>> to the <<1>> again will be called instants J.

Just before an instant T0, output Q of flip-flop 3 is at the <<0>> state, so that the R input of register 26 is at the <<1>> state. Outputs S of register 26 are thus all at the is <<0>> state, so that number M formed by these states of the outputs is equal to zero. As will easily be seen, this number M still has the zero value at instant T0. It will thus be called M0.

Since number M0 is zero, again just before instant T0, outputs S of comparator 27 and data input D of flip-flop 10 are at the <<1>> state. Further, selector 24 connects its inputs E2 to its outputs S so that number N3 is present at inputs E1 of adder circuit. 25. Since number M0 present at inputs E2 of adder circuit 25 is zero, it is also number N3 which is present at outputs S of adder circuit 25 and thus at inputs E of register 26.

As in the case of the device of FIG. 1, it will be assumed that, again just before instant T0, output Q of flip-flop 4 is at the <<1>> state.

It can easily be seen that, as in the example of FIG. 1, each driving pulse is subdivided into 128 elementary periods. It will be assumed arbitrarily, and to take a concrete example, that number N1 of these elementary periods during which coil 14 has to be connected to source 15, is equal to 90 in this example or, which amounts to the same thing, that the number (−N1) present at outputs S1 of determination circuit 23 is equal to (−90). It follows that number N3 present at outputs S2 of determination circuit 23 is equal, in this example, to (128−90), i.e. to 38. It can be seen that, in this case, desired chopping rate Hc is equal to 90/128, namely practically 0.7, i.e. that it has the same value as in the example of FIG. 1.

At instant T0, signal 2a provided by time base 2 passes to the <<0>> state so that output Q of flip-flop 3 passes to the a <<1>> state. Simultaneously, signal 2c also passes to the <<0>> state. Since input D of flip-flop 10 is then at the <<1>> state, output Q of flip-flop 10 also passes to the <<1>> state. As in the case of FIG. 1, shaping circuit 12 then connects coil 14 of motor 13 to source 15 so that a current begins to flow in said coil 14.

At instant J1 which immediately follows instant T0, signal 2c again passes to the <<1>> state so that input C of register 26 passes to the <<0>> state. In response to this passage, outputs S of register 26 take the state of inputs E thereof. In other words, number M takes a value M1 which is equal to number N3, namely 38 in this example. As this number M1 is now greater than zero, output S of comparator 27 takes the <<0>> state, as does input D of flip-flop 10. Moreover, selector 24 now selects the number (−N1) present at its inputs E1, so that this number (−N1) is applied to inputs E1 of adder circuit 25. Outputs S of this adder circuit 25 thus now have a number equal to N3+(−N1 ), namely, in this example, a number equal to (38−90), i.e. (−52).

At the instant T1 which follows instant J1, signal 2c passes to the <<0>> state gain. Output Q of flip-flop 10, whose input D is now at the <<0>> state, also takes the <<0>> state, so that shaping circuit 12 disconnects coil 14 from source 15. At the following instant J, i.e. instant J2, signal 2c again passes to the <<1>> state, so that input C of register 26 passes to the <<0>> state. Number M thus takes a value M2 which is that of the number present at this instant at inputs E of the register, i.e. (−52) in this example.

Since this value M2 is less than zero, output S of comparator 27, like input D of flip-flop 10, again takes the <<1>> state. It is thus number N3 which is again selected by selector 24 and applied to inputs E1 of adder circuit 25.

The number present at outputs S of adder circuit 25 thus takes a value equal to M2+N3 namely, in the present example, (−52+38), i.e. (−14).

At the following instant T, i.e. at instant T2, signal 2c again takes the <<0>> state, so that output Q of flip-flop 10 whose input D is now at the <<1>> state also takes the <<1>> state. Shaping circuit 12 thus again connects coil 14 to source 15.

At the following instant J, i.e. instant J3, input C of register 26 again passes to the <<0>> state, so that number M takes a value M3 equal to that of the number present at outputs S of adder circuit 25, namely, (−14) in this example.

Since number M is still negative, it is again number N3 which is applied to inputs E1 of adder circuit 25, so that outputs S of adder circuit 25 now have a number equal to (−14+38) i.e. 24.

For the same reason, output Q of flip-flop 10 remains at the <<1>> state at the following instant T, i.e. at instant T3, so that coil 14 remains connected to source 15.

At instant J4, number M takes a value M4 which is equal to 24 in the present example. Since this value is positive, it is now the number (−N1) which is applied to inputs E1 of adder circuit 25, so that outputs S thereof have a number equal to (24−90) i.e. (−66).

Moreover, since number M still has this positive value M4 at instant T4, output Q of flip-flop 10 again passes to the <<0>> state at instant T4 and shaping circuit 12 disconnects coil 14 from source 15.

As in the case of FIG. 1, the process which has just been described continues to occur until signal 2b passes to the <<0>> state again at instant T128, i.e. 7.8 ms after instant T0.

The effects of output Q of flip-flop 3 passing to the <<0>> state at instant T128 are practically the same as in the case of FIG. 1 and will not be described again. It will simply be noted that, at this instant T128, the effect of the output of inverter 9 passing to the <<1>> state is that the number M present at outputs S of register 26 takes its value M0 again, which, as was seen, is equal to zero.

Moreover, determination circuit 23 gives a new value to numbers N1 and N3 in response to the detection signal which it receives from detector 16 just after instant T128, this new value being determined in the manner described above.

It can be seen that the device according to the present invention shown in FIG. 2 is even simpler than that shown in FIG. 1, while having the same advantages as the latter with respect to known devices.

In short, it can be seen that in the method according to the present invention, each driving pulse is subdivided into a certain number of elementary periods, 128 in the present example, all having the same duration. Moreover, the value that effective chopping rate He takes at the beginning of the following elementary period is calculated directly or indirectly at each elementary period, this value is compared, also directly or indirectly, to that of desired chopping rate Hc. Finally, at the beginning of the following elementary period, the coil of the stepping motor is connected to the source which supplies the device with power or the coil is disconnected from the source according to whether the above comparison shows that effective chopping rate He is less than or equal to desired chopping rate Hc or whether rate He is greater than rate Hc.

It is clear that numerous modifications can be made to the device according to the present invention two examples of which were described above, without thereby departing from the scope of the invention. Thus, for example, comparator 21 of the device of FIG. 1 can be replaced by a subtractor circuit performing the subtraction of desired rate Hc from effective rate He. In this case, the device must also include a circuit comparing the result of this subtraction with zero and providing input D of flip-flop 10 with a signal having the <<1>> state if this result is less than or equal to zero and the <<0>> state if this result is greater than zero.

Again by way of example, the duration of each driving pulse applied to the coil of the stepping motor can be different to that which it has in the above examples. Likewise, each driving pulse can be subdivided into a different number of elementary periods than that which was used in the above examples.

Furthermore, the calculation of effective chopping rate He and the comparison thereof with desired chopping rate Hc, which are performed at instants J situated in the middle of each elementary period in the above examples, can very well be performed at another instant situated elsewhere rather than in the middle of the elementary period.

Moreover, the circuit for determining desired chopping rate Hc can be arranged so that the latter rate varies in a different manner to that described above in response to the signal provided by the circuit for detecting the rotation or non-rotation of the motor rotor.

Moreover, the invention can obviously also be used in a device other than an electronic timepiece, the signal causing the application of a driving pulse to the motor coil, i.e. signal 2a in the above examples, being quite capable of having a different periodicity thereto, or even not being periodic.

What is claimed is:

1. A method for controlling a stepping motor including a rotor provided with permanent magnet and a coil magnetically coupled to said magnet, said method including the application of a driving pulse to said coil each time that said rotor has to rotate by one step, said driving pulse including connection periods during which said coil is connected to an electric power source and disconnection periods during which said coil is disconnected from said source, the ratio between the total duration of said connection periods and the total duration of said driving pulse being equal to a desired chopping rate, said method including the steps of:

subdividing said driving pulse into a first number of consecutive elementary periods, of at least substantially equal duration and each beginning at a determined instant;

determining at least indirectly, at each determined instant, an effective chopping rate which is equal to the ratio between on the one hand, a second number which is the number of said elementary periods which have elapsed since the beginning of said driving pulse and which form part of said connection periods, and, on the other hand, a third number which is the total number of said elementary periods which have elapsed since the beginning of said driving pulse;

comparing at least indirectly, at said each determined instant said effective chopping rate and said desired chopping rate;

connecting said coil to said source at said determined instant if said comparison shows that said effective chopping rate is less than or equal to said desired chopping rate; and disconnecting said coil from said source at said each determined instant if said comparison shows that said effective chopping rate is greater than said desired chopping rate.

2. A method according to claim 1, wherein said second number and said third number are obtained by counting, from the beginning of said driving pulse, the elementary periods forming part of said connection periods and, respectively, all the elementary periods, and wherein said effective chopping rate is obtained by dividing said second number by said third number.

3. A method according to claim 2, wherein it includes a direct comparison of said effective chopping rate to said desired chopping rate by a comparator circuit.

4. A method according to claim 2, wherein it includes a subtraction of said effective chopping rate and said desired chopping rate and a comparison of said subtraction with zero.

5. A method according to claim 1, including the steps of:

supplying a fourth number, which is always negative, and a fifth number, which is always positive or zero, said fourth and fifth numbers being such that the ratio between, on the one hand, the absolute value of said fourth number and, on the other hand, the sum of said absolute value and said fifth number is equal to said desired chopping rate;

said determination of said effective chopping rate including calculating, at said each determined instant, a sixth number which his equal to the sum of a seventh and an eighth number, said seventh number being equal to the value that said sixth number had during the elementary period immediately preceding said each determined instant and said eighth number being equal to said fourth number if said seventh number is greater than zero and being equal to said fifth number if said seventh number is less than or equal to zero; and said comparison between said effective chopping rate and said desired chopping rate including the comparison of said sixth number with zero.

6. A device for implementing the method of claim 1, including determination means for determining said desired chopping rate, further including:

means for generating a periodic subdivision signal for said driving pulse, said signal defining said determined instants;

computing means responding to said periodic signal to calculate, at least indirectly, a variable representative of said effective chopping rate at each of said determined instants;

comparison means responding to said variable to generate a comparison signal between said effective chopping rate and said desired chopping rate;

chopping means responding to said comparison signal to connect said coil to said source if said effective chopping rate is less than or equal to said desired chopping rate and to disconnect said coil from said source if said effective chopping rate is greater than said desired chopping rate.

7. A device according to claim 6, wherein said computing means includes a first counter responding to said periodic signal and to said chopping signal to generate said second number, a second counter responding to said periodic signal to generate said third number and a divider circuit responding to said second and to said third number to generate said effective chopping rate.

8. A device according to claim 7, wherein said comparison means includes a comparator responding to said effective chopping rate and to said desired chopping rate to generate said comparison signal.

9. A device according to claim 6, wherein:

said determination means are arranged to provide a fourth number which is always negative, and a fifth number which is always positive or zero, said fourth and fifth numbers being such that the ratio between, on the one hand, the absolute value of said fourth number and, on the other hand, the sum of said absolute value and said fifth number is equal to said desired chopping rate;

said computing means include a selector circuit having first inputs receiving said fourth number, second inputs receiving said fifth number and outputs having a selected number which is equal to said fourth or said fifth number according to whether said comparison signal has a first or a second state, an adder circuit having first inputs connected to the outputs of said selector circuit, second inputs receiving a sixth number and outputs having, at each determined instant, the sum of a seventh and an eighth number, said seventh number being equal to said selected number and said eighth number being equal to the value that said sixth number had during the elementary period immediately preceding said determined instant, and a register having inputs connected to the outputs of said adder circuit and outputs connected to the second inputs of said adder circuit and having said sixth number in response to said periodic signal; and said comparison means includes a comparator circuit having inputs connected to the outputs of said register, an output providing said comparison signal, and arranged so that said comparison signal has its first or second state according to whether said sixth number is less than or equal to zero, or whether said sixth number is greater than zero.

* * * * *